Patented July 3, 1923.

UNITED STATES PATENT OFFICE.

ANDRÉ WAHL, OF ENGHIEN, AND ROBERT LANTZ, OF PARIS, FRANCE, ASSIGNORS OF NINE-TENTHS TO SOCIÉTÉ ANONYME DES MATIÈRES COLORANTES & PRODUITS CHIMIQUES DE SAINT-DENIS, OF PARIS, FRANCE.

MANUFACTURE OF 2-OXY-1-ARYL NAPHTHYLAMINES.

No Drawing.     Application filed February 14, 1922. Serial No. 536,507.

*To all whom it may concern:*

Be it known that we, ANDRÉ WAHL and ROBERT LANTZ, both citizens of the Republic of France, residing in Enghien, Seine and Oise, France, and in Paris, France, respectively, have invented new and useful Improvements in the Manufacture of 2-Oxy-1-Aryl-Naphthylamines, which is fully set forth in the following specification.

Of the numerous oxyphenylnaphthylamines the existence of which is theoretically possible, a very small number is as yet known. The compounds which have been described have the following constitution:

$OH:NHC_6H_5=2:7$
"    "    $=1:3$
"    "    $=1:2$
"    "    $=1:4$

The last-named has been recently identified, forming the subject-matter of a patent application of Kalle & Co., published in Berlin on the 9th May 1921.

The general method for obtaining these compounds consists in the reaction of aniline on the corresponding amino-, oxy- or dioxy-naphthalenes. Thus, 2:7-dioxynaphthalene, heated with aniline at 190° C. for 10 hours (O. Fischer and Shütte, Berichte, vol. 26, page 3087, Kalle & Co., German specification 60103) or heated with aniline in presence of calcium chloride (Clausius, Berichte vol. 23, page 517) furnishes 2:7-oxyphenyl-naphthylamine in addition to the diphenyl derivative. So also, 1:3-dioxynaphthalene yields under the same conditions 1-oxy-3-phenylnaphthylamine (Friedlaender and Rudt, Berichte vol. 29, page 1609). Finally, aniline at 180° C. transforms 1:4-amino-naphthol into 1:4-oxyphenylnaphthylamine (Kalle aforesaid patent application).

As to the 1:2-derivative corresponding with the following formula I, this has been obtained by reduction of the naphthoquinone-anilide (Ruler Ber. vol. 39, page 1038).

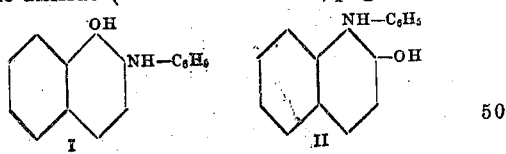

Now we have found that it is easy to obtain oxyarylnaphthylamines corresponding with the oxy-phenylnaphthylamine isomeric with the preceding one and shown in formula II, by a reaction entirely different from those aforesaid. We have found, contrary to expectation, that the halogen element of the α-halogen-β-naphthols possesses great mobility which fits it for a certain number of reactions.

This particular mobility is unexpected because the halogen derivatives of phenol whether chloro- or bromo-derivatives, are remarkable as having their halogen element very firmly fixed to the nucleus (Farben-fabriken Bayer German patent specification 249,939).

It would not appear on the face of it, therefore, that the halogen element contained in the molecule of the naphthol would behave differently.

However, we have found that by causing primary amines to react with α-chloro or α-bromo-β-naphthol, under certain conditions there is easily obtained the substitution of an aryl group for the halogen, in accordance with the equation:

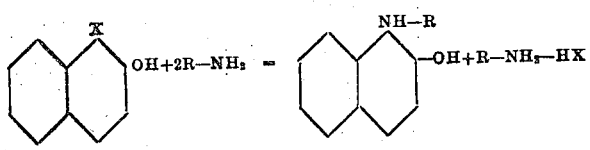

in which X indicates a halogen element and R.NH₂ a primary amine.

Primary bases have frequently been caused to react with halogen derivatives of naphthols but the results obtained have been very different from those obtained by ourselves. Thus Rèverdin and Crèpieux (Berichte vol. 28, page 3049) found that a red coloured derivative is formed when α-chloro-α-naphthol or its carbonate is heated with aniline. On the other hand, Meldola (Journal of the Chemical Society 1884, page 158) obtained β-naphthoquinone-dianilide by heating dibromo-α-naphthol with aniline in excess. These are very complex reactions which have nothing in common with the regular reaction that we have observed.

The action of $\alpha$-halogen-$\beta$-naphthol on a primary amine may be carried out under very varied conditions, for instance by heating the reacting bodies to a suitable temperature, it may be within a suitable solvent or with addition of a subdivided metal like zinc, precipitated tin, iron, lead or copper. But in this last case, while the speed of the reaction is accelerated, formation of secondary reactions is favoured.

The following examples illustrate the invention, the parts being by weight:—

*Example I.*—In a reflux apparatus a mixture of 1 part of $\alpha$-chloro-$\beta$-naphthol and 5 parts of aniline is boiled for about 3 or 4 hours. The progress of the reaction may be followed by observing the hydrogen chloride liberated, and when the reaction is complete the excess of aniline and of the chloronaphthol is removed, should any remain, by a current of steam. The residual product is then washed with dilute caustic soda solution; the alkaline solution is acidified, the precipitate collected and purified by crystallisation first from benzene and then from a mixture of acetic and formic acids.

It forms white needles which become reddish-grey in air and corresponds analytically with the formula $C_{16}H_{13}NO$.

|  | Per cent. |  | Per cent. |
|---|---|---|---|
| Calculated for $C_{16}H_{13}NO$, | C = 81.70; | found | C = 81.61 |
|  | H = 5.53; | " | H = 5.85 |
|  | N = 5.95; | " | N = 5.93 |

It is, therefore, undoubtedly 2-oxy-1-phenylnaphthylamine. The crystals melt at 153–154° C.

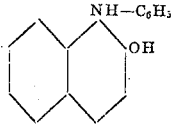

They are insoluble in cold water, little soluble in boiling water, soluble in caustic alkalies, from which solutions acids re-precipitate the original product. The alkaline solution becomes colored in air and covered with a yellowish pellicle, which is a product of oxidation.

*Example II.*—1 part of $\alpha$-bromo-$\beta$-naphthol and 5 parts of para-toluidine are heated together in a bath of paraffin at 125–130° C. for 2–3 hours; the product thickens owing to the formation of crystals. It is treated with dilute hydrochloric acid which eliminates the excess of the base and the residual product is first distilled in steam, to expel any $\alpha$-bromo-naphthol which may remain, and then purified by crystallisation from benzene or from a mixture of formic and acetic acids.

The 2-oxy-1-paratolylnaphthylamine thus obtained forms white crystals melting at 137–138° C., the chemical properties of which are very similar to those of the product obtained by Example I.

In the foregoing examples the aniline or the toluidine can be exchanged for other primary bases.

Having thus described the nature of the said invention and the best means we know of carrying the same into practical effect, we claim:—

1. The herein described manufacture of 2-oxy-1-aryl-naphthylamines by causing primary amines to react with $\alpha$-halogen-$\beta$-naphthols.

2. As a new manufactured product, the 2-oxy-1-aryl-naphthylamines having at the ordinary temperature the form of crystals which are insoluble in water but soluble in the caustic alkalies and are precipitated from their solution in the caustic alkalies by the acids.

3. The manufacture of 2-oxy-1-phenyl-naphthylamine by causing aniline to react with $\alpha$ halogeno $\beta$ naphthol.

4. 2-oxy-1-phenylnaphthylamine consisting of insoluble crystals melting at 153–154° C., soluble in the caustic alkalies and precipitated from its solution in the caustic alkalies by the acids, the alkaline solution becoming colored in air.

In testimony whereof we have signed this specification.

ANDRÉ WAHL.
ROBERT LANTZ.